United States Patent [19]

Mestdagh

[11] 4,107,743
[45] Aug. 15, 1978

[54] CASSETTE RECORDER WITH ANTI-ERASE INTERLOCK

[75] Inventor: Gilbert Edouard Mestdagh, Eindhoven, Netherlands

[73] Assignee: U.S. Philips Corporation, New York, N.Y.

[21] Appl. No.: 787,028

[22] Filed: Apr. 13, 1977

[30] Foreign Application Priority Data

May 6, 1976 [NL] Netherlands .................. 7604825

[51] Int. Cl.² .................. G11B 15/04; G11B 21/04
[52] U.S. Cl. .................. 360/60; 360/105
[58] Field of Search .................. 360/60, 62, 105

[56] References Cited

U.S. PATENT DOCUMENTS 3,752,486  8/1973  Nakamura .................. 360/60

FOREIGN PATENT DOCUMENTS 47-15,634  2/1968  Japan .................. 360/60
47-31,452  2/1968  Japan .................. 360/60

Primary Examiner—Robert S. Tupper
Attorney, Agent, or Firm—Frank R. Trifari; David R. Treacy

[57] ABSTRACT

A magnetic tape cassette recorder for use with a cassette having anti-erase openings, and a sensor for scanning the rear wall of a cassette for the presence of anti-erase openings. The sensor and the recording control button are portions of a single rigid member, which member is movable in one direction into and out of an anti-erase opening between blocked and unblocked inactive positions, and along the rear wall of a cassette having no opening from the unblocked inactive to a recording position. When the sensing portion has entered an anti-erase opening in the rear wall of a cassette, the recording control button is recessed in the recorder housing so as not to be manually accessible for attempted movement into the recording position.

6 Claims, 5 Drawing Figures

CASSETTE RECORDER WITH ANTI-ERASE INTERLOCK

BACKGROUND OF THE INVENTION

1. Field of the Invention

The invention relates to a cassette apparatus for recording and/or reproducing signals on a magnetic tape in a cassette (hereinafter referred to as a tape cassette recorder), which cassette may have one or more anti-erase openings for preventing the inadvertent erasure of a pre-recorded magnetic tape and more particularly to a tape cassette recorder having a housing; a head support which supports magnetic heads and is movable between an operating position near a cassette and a neutral position which is more remote from the cassette; a recording button which is manually movable from a inactive position to a recording position with a finger; a recording switching member connected to the recording button and operating a recording switch which electrically selects the recording or reproducing mode of operation; a sensor which detects the presence of an anti-erase opening by engaging the cassette rear wall at the known location for such openings, and at least partly projecting into the opening to assume a first position, while being in a second position in the absence of an opening; and blocking means for blocking the recording switching member in its inactive position when the sensor is in its first position.

Cassette equipment, which is manufactured in large quantities and available on the market in a wide variety, has greatly contributed to the advancement of magnetic tape as an audio-signal carrier. There is a trend towards ever-increasing perfection of cassette equipment and also towards making it cheaper so that it comes within reach of a larger public. Much attention is also paid to ease of operation. Modern inexpensive and portable cassette equipment, frequently combined with a radio, is operated by means of a number of push-buttons which are arranged side by side for controlling tape driving functions and audio playback.

Equipment of these types often has the capability to record audio signals on the magnetic tape they are generally referred to as cassette recorders. The commercially available cassette recorders usually have a recording button which can be depressed only if the cassette has a closed rear wall. When the cassette is provided with pre-recorded audio tracks by the manufacturer, so-called anti-erase openings are formed in the rear wall of the cassette. Location of such openings is standardized by International Electrotechnical Commission Publication 94A. These openings cooperate with components which may be provided in a cassette recorder to prevent the audio track from being inadvertently erased by the actuation of the recording button by a user.

2. Description of the Prior Art

Anti-erase interlocking is usually provided by blocking the movements of the recording button when a pre-recorded cassette is placed in the cassette apparatus. Generally, a pivotable sensor is mounted on the cassette apparatus near the rear of the cassette. The sensor allows movements of the recording button between its inactive and its recording position only when pressure against the closed rear cassette wall tilts the sensor.

To record audio signals on a non-prerecorded cassette, the button which starts the tape transport of the cassette recorder should be depressed in addition to the recording button. Upon depression the various buttons each engage with a locking slide, so that when a specific button has been depressed and subsequently another button is depressed the previously depressed button returns to its inactive position. Only the recording button and the starting button can be locked in their active positions at the same time; however, the two keys must then be depressed simultaneously.

Simultaneous key depression is a particular problem with cheap portable cassette recorders, which are light and small. Actuating the recording button and the starting button, by pressing with two fingers of one hand while the other hand supports the cassette recorder to take up the reaction force, is not always convenient.

SUMMARY OF THE INVENTION

An object of the invention is to provide a more convenient recording control mechanism.

A further object of the invention is to simplify nonportable and less inexpensive tape cassette recorders by eliminating a number of components.

According to the invention the recording button, the recording switching member and the sensor are rigidly connected to each other to form one combined recording member which in the inactive position is bodily movable between a blocked inactive position corresponding to the first position of the sensor and an unblocked inactive position corresponding to the second position of the sensor. The combined recording member is further movable in a different direction between the unblocked inactive position and a recording position, the sensor being slidable along the rear wall of an inserted cassette between the unblocked inactive position and the recording position.

By combining the recording button with the recording switching member and the sensor in one recording member the number of parts is clearly reduced.

In contradistinction to the recording buttons in the prior cassette equipment described above, the recording button in the cassette apparatus in accordance with the invention is movable in two directions, namely between a recording position and an unblocked inactive position and (in a different direction) between the unblocked inactive position and a blocked inactive position. The last-mentioned position is obtained when playing pre-recorded cassettes.

The movement which the combined recording member can perform in its inactive state between its unblocked and its blocked position enables the use of a preferred embodiment of the invention in which, in the blocked inactive position, the recording button is covered by housing parts so as to prevent actuation by a user and/or provide a visual indication of the presence of a pre-recorded cassette. A user can now directly and easily notice whether recording is possible or impossible by the recording button being visible or invisible outside the housing, particularly if this button has a bright color constrasting with from that of the housing. This embodiment also precludes forced actuation of the recording button. This is a major advantage in comparison with known cassette equipment having an anti-erase interlock. Users have frequently tried to depress the recording button by force in order to make a recording, although it was not possible because the apparatus contained a pre-recorded cassette and the recording button was blocked. As the user cannot perceive this and may assume that the recording button is sticking and may be brought into its recording position by exerting greater force damage to the cassette apparatus is a likely result. Particularly in the case of cassette equipment with a plastic parts in the tape transport mechanism, which are now gaining popularity, this is highly probable.

In yet another preferred cassette apparatus in accordance with the invention the recording button may be mounted on a side of the apparatus opposite the side where the other actuating members are located is therefore no longer necessary to simultaneously actuate two buttons with fingers of one hand, while holding the apparatus with the other. By holding the apparatus in one hand and depressing the starting button with one finger, and subsequently actuating the recording button with a finger of the other hand, for example by moving it from its inactive unblocked position, simpler operation is obtained to its recording position.

In another, still more convenient embodiment, the starting button is depressed after the recording button, and this second movement locks both buttons. To accomplish this the locking means for locking the combined recording member comprises portions of the recording member and portions of the head support which cooperate with each other only when the head support is in its operating position and at the same time the recording member is in its recording position. This embodiment enables simplification of the locking slide used for locking the other actuating members. Another advantage of this embodiment is that only a very small spring force is needed to return the recording member from its recording position to its inactive position, so that the various parts of the apparatus are only loaded slightly. This is much less than the force generally needed to actuate push-buttons which are locked by a locking slide.

In a most practical preferred embodiment the combined recording member is an elongated body with the recording button at one end and the locking means which cooperates with the head support near the other. The housing guides the recording member for generally longitudinal movement between its blocked and its unblocked inactive positions, and pivotal movement a limited extent about an axis perpendicular to its longitudinal direction between the unblocked inactive position and the recording position. In cheap, small portable cassette recorders having a plastic housing, surfaces are easily molded on the inside of the housing for pivotably and longitudinally guiding the recording member.

The invention will be described in more detail with reference to the drawing of a preferred embodiment.

Figure 1:
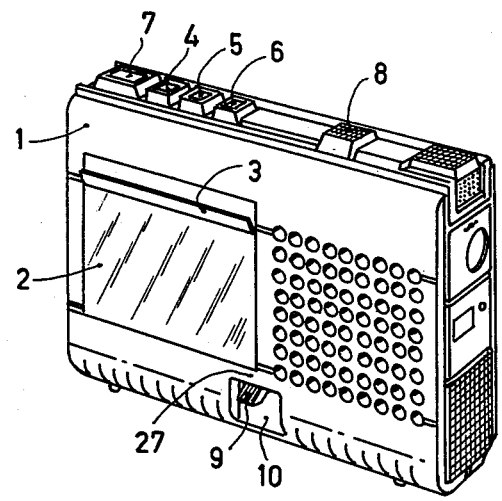
FIG. 1 is a perspective view of a small portable cassette recorder according to the invention.

The cassette recorder of FIG. 1 has a plastic housing 1 which accommodates a tape transport mechanism, not shown. A transparent lid 2 covers a cassette compartment in which a cassette can be placed. This lid can be opened by hand by means of a raised edge 3. At the top of the recorder a number of controls are located, namely a starting button 4, two buttons 5 and 6 for fast forward and reverse winding of the magnetic tape, and a reset button 7. A slide button 8 is connected to a potentiometer for controlling the volume from sound of an amplifier which has been built into the apparatus.

A recording button 9 is disposed opposite the pushbuttons 4 to 7, in a recess 10.

Figure 2:
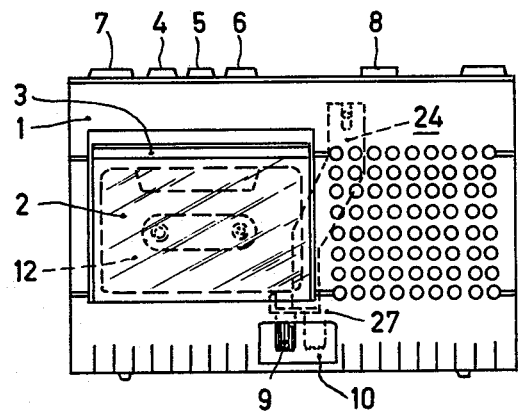
FIG. 2 is a elevation front view of the recorder of FIG. 1, a cassette and a combined recording member being represented by dashed lines.

FIG. 2 shows a cassette 12 held in the recorder, which cassette does not have an anti-erase opening. In FIGS. 1 and 2 the button 9 is shown in its inactive unblocked position. With a finger the button 9 is manually movable in the recess 10 in the housing 1 between the inactive position shown in FIGS. 1 and 2, and the recording position which is represented by dashed lines in FIG. 2. The most convenient method of operation is probably as follows: the apparatus is held in the right hand and with the left-hand forefinger the recording button 9 is moved to the recording position which is shown dashed in FIG. 2. With the finger still at the recording button the apparatus is taken into the left hand and the starting button 4 is depressed with the right-hand forefinger. Subsequently button 9 is released and then also button 4. The locking system which permits this mode of operation is described below.

The operation of the cassette recorder is described with reference to FIGS. 3 to 5. In these three figures a head support 11 is shown in an operating position facing a cassette 12 because the starting button 4 is depressed. The head support carries two magnetic heads 13 and 14, the former serving for recording or reproducing audio signals and the latter for erasing said signals. A pressure roller 15 is rotatably journalled on a pivotable lever 16 which is pressed by a pressure spring 17 against a capstan 18. It is apparent that the magnetic tape of a cassette which is placed on the apparatus passes between the pressure roller 15 and the capstan 18, but this is not shown in the drawing.

An electrical switch 19 switches the recorder from the reproducing or playback mode to the recording mode.

The recording button 9 is rigidly connected to a recording switching member 20 and to a sensor 21, the three functional elements being portions of a combined recording member 24, preferably manufactured as a unitary member from a plastic material.

Figure 3:
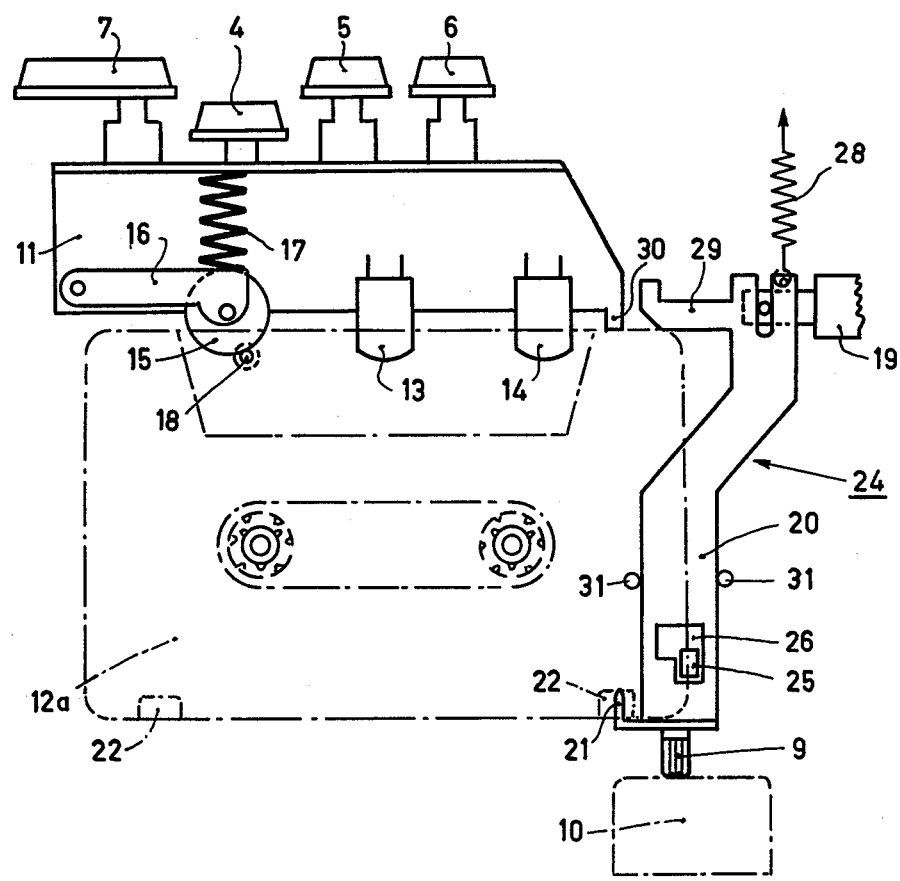
FIG. 3 is a diagrammatic elevation showing the cooperation of a combined recording member with a head slide of an apparatus in accordance with FIGS. 1 and 2, the position of a cassette with anti-erase openings being represented by dash-dot lines.

In FIG. 3 the sensor projects into one of the two anti-erase openings 22 of pre-recorded cassette 12a. As in FIG. 2, FIGS. 4 and 5 show the situation in which the cassette 12 has a closed rear wall. The rear wall of the cassette 12 contains break-out portions 23 which may be removed by a user if the program which has been recorded on the magnetic tape is to be retained in future.

Figure 4:
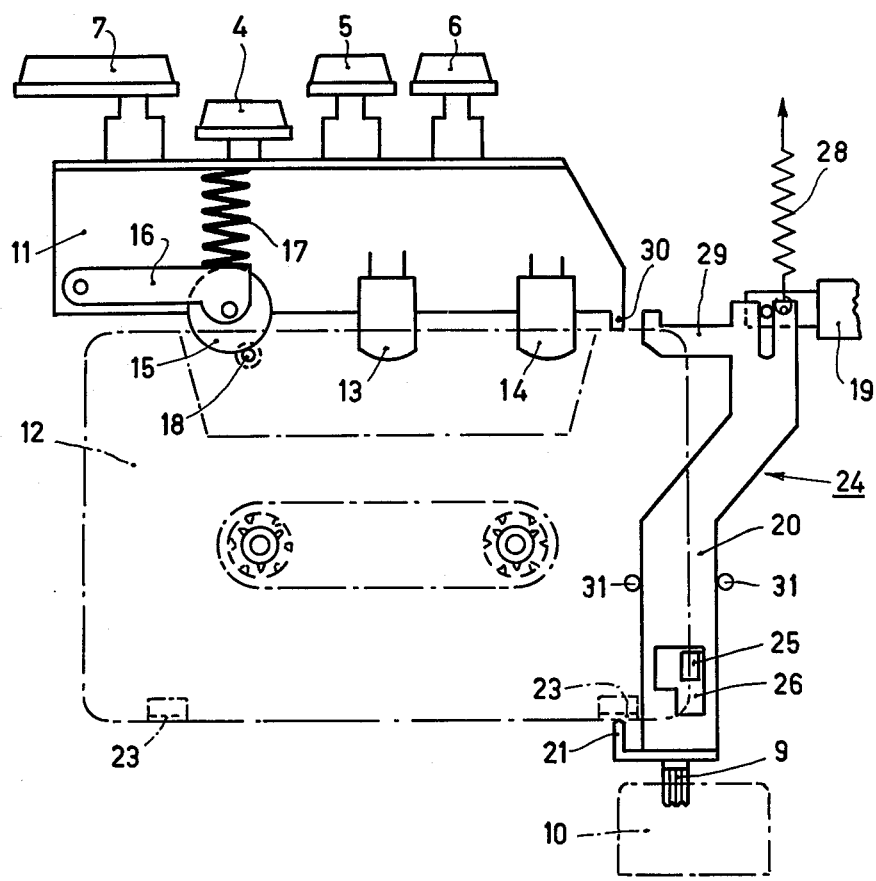
FIG. 4 is an elevation similar to that of FIG. 3, but with a the cassette having a closed rear wall and the recording member in its unblocked inactive position, and, FIG. 5 is similar to FIG. 4 but with the recording member in its locked recording position.
Figure 5:
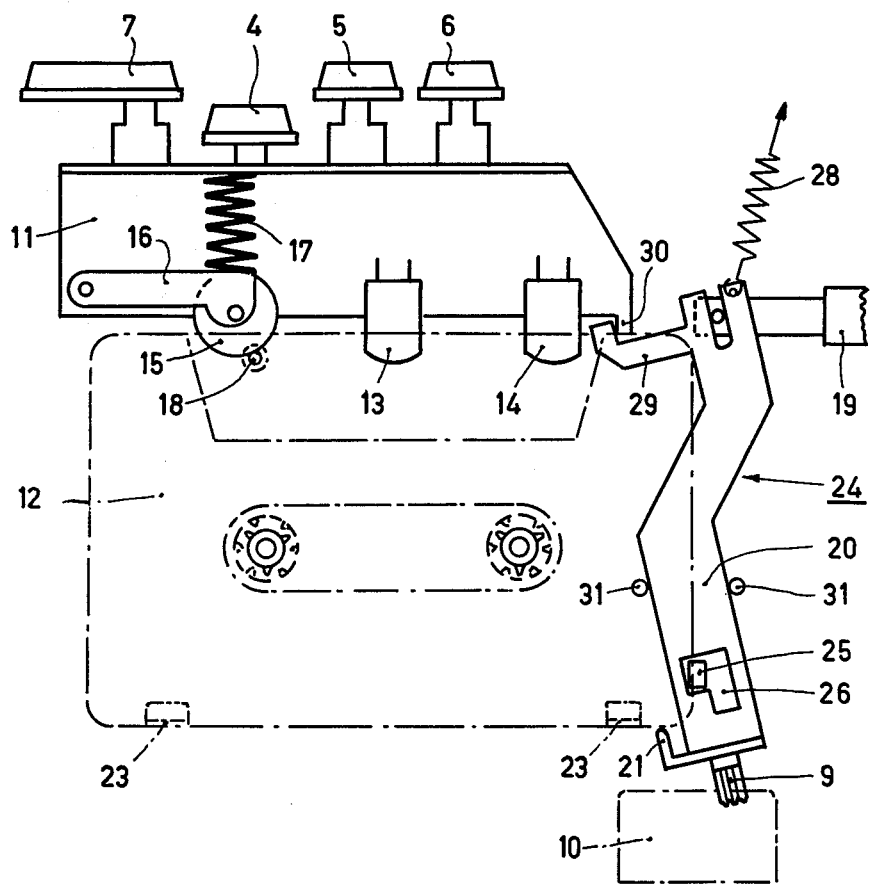

The three positions which the recording member 24 can occupy are shown in FIGS. 3, 4 and 5. In FIG. 3 the recording member is in its blocked inactive position. A blocking pin 25 is formed on the housing, the pin projecting through a substantially L-shaped opening 26 of the recording member. In this position the recording member cannot be pivoted, or the button 9 moved sideways. Moreover the recording button 9 is no longer externally visible or manually accessible because it is concealed by a housing portion 27 (shown in FIGS. 1 and 2). Thus, this position provides a direct visual indication of the impossibility of making a recording, either because of the presence of anti-erase openings in the rear wall of a cassette which has been placed in the apparatus or the absence of a cassette. Actuation of the recording switching member 24 is not possible.

In FIG. 4 the combined recording member 24 is pressed outwards by the break-out lugs 23 in the rear wall of the cassette 12, against the tensile force of a tension spring 28, so that the recording button 9 is positioned in the recess 10 in the housing and is accessible for actuation by a finger. In the position shown the recording member is in its unblocked inactive position, and can be moved to the recording position by pressing sideways against the recording button 9. The blocking pin 25 is now located in a part of the opening 26 which allows such a movement. The sensor 21 is pulled against the rear wall of the cassette by the spring 28, but is movable along this wall.

FIG. 5 shows the recording position of the recording member 24. The locking means for locking the recording member 24 in its recording position is formed by a surface on a hook-shaped portion 29 of the recording member and a mating surface on a lug 30 of the head support 11. These parts co-operate each other only if the head support 11 is in its operating position and at the same time the recording member 24 is in its recording position. Cooperation of the locking means 29 and 30 as shown in FIG. 5 can be achieved only if the recording member 24 is first moved to its indicated position and subsequently the head support 11 is moved from its neutral position into its operating position shown. Thus it is ensured that the playback position shown in FIG. 4 cannot be changed to the recording position shown in FIG. 5 by merely actuating the recording button 9. In this way inadvertent change-over from playback to recording during reproduction of a certain passage is prevented, which would result in the recording on the tape or at least part of it being erased.

The combined recording member 24 is shaped as an elongated body having the recording button 9 at one end and the locking means 29 near its other end. In order to control the movements of the recording member the housing 1 includes two guide pins 31 in addition to the blocking pin 25. As a result the recording member can be slid substantially in its longitudinal direction between the positions shown in FIGS. 3 and 4 and can also be pivoted to a limited extent about an axis intermediate the sensing and button portions of the member, perpendicular to its longitudinal direction, between the positions shown in FIGS. 4 and 5. Instead of the embodiment shown, in which two pins 31 are located on either side of the recording member 24, it is also possible to use a single pin which projects through a longitudinal slotted opening of the recording member.

The recording member 24 is integrally manufactured from a suitable plastic. Obviously it is possible, without departing from the principle of the invention, to assemble the combined recording member from a multiplicity of parts and to select a recording member of completely different shape. However, in this respect it is essential for the invention that the sensor is rigidly connected to the recording switching member and that these are jointly movable in two directions with the recording button, namely in a direction corresponding to a movement of the sensor into and out of an anti-erase opening of a cassette and a movement along the rear wall of a cassette.

What is claimed is:

1. A tape cassette recorder for use with a cassette of a type in which anti-erase openings are provided to prevent inadvertent erasure of pre-recorded tape, comprising:
 a housing,
 means mounted to the housing for holding a cassette in the recorder,
 means for controlling tape driving functions of said recorder,
 means for manually selecting a recording or reproducing mode of operation,
 means for recording and playing back information on tape in a cassette held in the recorder, in response to selection of the recording or playback mode of operation,
 means for sensing presence of an anti-erase opening in a cassette held in the recorder, and
 means for blocking manual selection of the recording mode responsive to sensing presence of an anti-erase opening;
 wherein said means for manually selecting and said means for sensing consist of a single rigid combined recording member, means for mounting said member for movement relative to the housing and a cassette in the recorder between a recording position and at least one inactive reproducing position, and means for switching the recorder to a recording condition responsive to said member being in the recording position and to a reproducing condition responsive to said members being in one of the inactive reproducing positions; and said member has a first portion arranged for sensing movement into an anti-erase opening where such opening is provided in a cassette held in the recorder, and a second portion accessible, at least in the absence of sensing of an anti-erase opening, for manual movement between said only one inactive reproducing and said recording positions.

2. A recorder as claimed in claim 1, wherein said single rigid member is movable between a blocked inactive reproducing position in which said first portion is disposed in an anti-erase opening; an unblocked inactive reproducing position in which said first portion abuts a cassette wall portion covering the location in which anti-erase openings are provided; and the recording position, and
 said first portion slides along said cassette wall when the member is moved from the unblocked inactive position to the recording position.

3. A recorder as claimed in claim 2 wherein said second portion is positioned to be accessible for direct manual actuation while in the recording and unblocked inactive reproducing positions; and is at least partially recessed into said housing while in the blocked inactive reproducing position.

4. A recorder as claimed in claim 3 wherein said second portion and said housing provide clear visible indication of the presence of a pre-recorded cassette.

5. A recorder as claimed in claim 2 comprising in addition means for locking the combined recording member in the recording position, wherein said means for recording and playing back includes a head support mounted to said housing for movement between a neutral and an operating position, and said means for locking comprises shaped surfaces on said head support and said member which interlock only while the support is in the operating position and the member is in the recording position.

6. A recorder as claimed in claim 5 wherein said member is generally elongated, and is slidable in its longitudinal direction between the blocked and unblocked inactive reproducing position, and pivotable about an axis transverse to said longitudinal direction and intermediate said first and second portions for movement between the unblocked inactive reproducing and the recording position.

* * * * *

UNITED STATES PATENT AND TRADEMARK OFFICE
CERTIFICATE OF CORRECTION

PATENT NO. : 4,107,743
DATED : August 15, 1978
INVENTOR(S) : GILBERT EDOUARD MESTDAGH It is certified that error appears in the above–identified patent and that said Letters Patent are hereby corrected as shown below:

IN THE CLAIMS:

Claim 1, line 36, change "at least" to --only-- line 38, "only" to --at least

Signed and Sealed this

Fifth Day of June 1979

[SEAL]

Attest:

RUTH C. MASON
Attesting Officer

DONALD W. BANNER
Commissioner of Patents and Trademarks